United States Patent [19]
Murkes

[11] 3,782,556
[45] Jan. 1, 1974

[54] FILTER FOR LIQUIDS

[75] Inventor: Jakob Murkes, Bandhagen, Sweden

[73] Assignee: Alfa-Laval AB, Tumba, Sweden

[22] Filed: Apr. 12, 1972

[21] Appl. No.: 243,394

[30] Foreign Application Priority Data
May 18, 1971 Sweden.................. 6424/71

[52] U.S. Cl......................... 210/409, 210/433
[51] Int. Cl................................ B01d 29/04
[58] Field of Search............. 210/321, 332, 333, 210/409–412, 433, 436

[56] References Cited
UNITED STATES PATENTS

| | | | |
|---|---|---|---|
| 3,491,887 | 1/1970 | Maestrelli | 210/332 X |
| 3,421,630 | 1/1970 | Acosta | 210/411 |
| 790,346 | 5/1905 | Cowern | 210/332 |

Primary Examiner—Frank A. Spear, Jr.
Assistant Examiner—Robert H. Spitzer
Attorney—Cyrus S. Hapgood et al.

[57] ABSTRACT

A closed chamber of a casing contains means forming substantially vertical channels extending completely through the chamber, each channel having a wall of filter material and also having an inlet and an outlet disposed outside the casing. The bottom wall of the chamber slopes downward to a separate outlet for the filtrate which passes through the filter material; and the top wall of the chamber slopes upward toward a separate outlet for a flushing liquid, which is supplied through the outlet for the filtrate.

2 Claims, 1 Drawing Figure

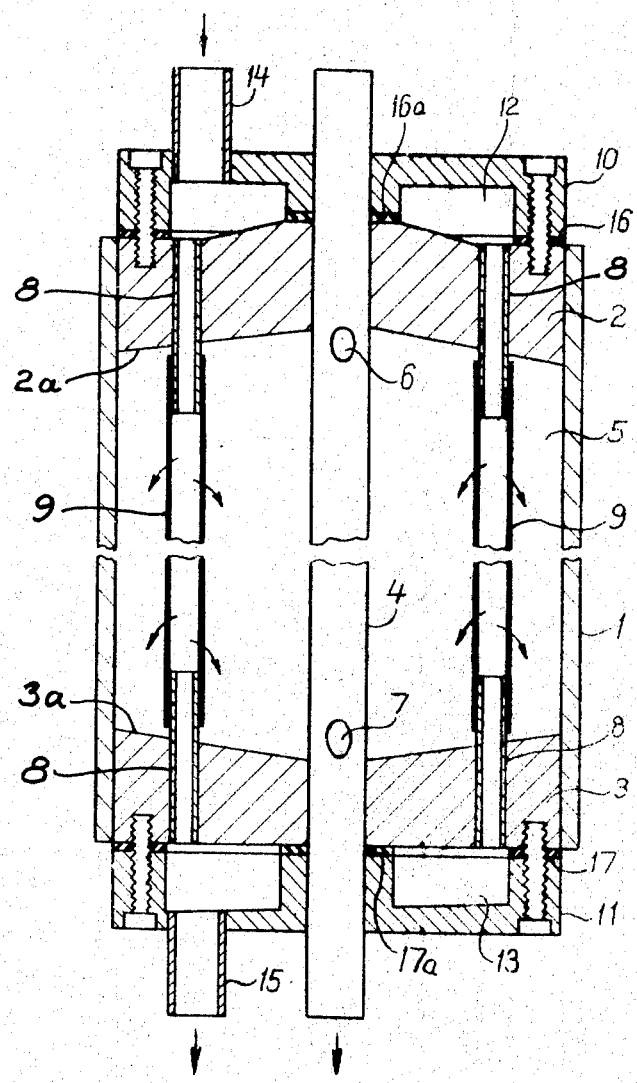

FILTER FOR LIQUIDS

The present invention relates to a device for filtering liquids and of the type comprising a closed casing forming a chamber which is provided with an outlet and which contains at least one substantially vertical channel passing completely through the chamber, the channel having a wall of filter material and being provided with an inlet as well as an outlet arranged at the outside of the casing.

A filtering device of this type is known in the art (see U.S. Pat. No. 2,083,183); but heretofore it has presented certain problems with respect to sanitation.

An object of the present invention is to provide a filtering device of this type which is sanitary, i.e., easy to keep clean and to flush clean. For this purpose, all flow must take place substantially vertically along the surfaces wetted with the liquid, and pockets must be eliminated to the utmost possible extent, thereby insuring that collections of sludge and bacteria or other micro-organisms on such surfaces are avoided as much as possible.

These requirements are met according to the present invention by means of a device of this type which is characterized in that the bottom of the casing chamber slopes downward toward an outlet for filtered liquid and that the top of the casing chamber slopes upward toward an outlet for flushing liquid.

The device according to the invention is especially suitable for such filtering operations as reverse osmosis and ultrafiltration but is also useful for filtering different liquids from each other.

According to a preferred embodiment of the invention, a vertical tube passes completely through the casing and has its wall pierced at both the highest and the lowest regions of the casing chamber. This tube can serve as an outlet for filtrate and also as an inlet and an outlet for flushing liquid, the latter being used for flushing clean the inside of the casing as well as the outside of the channels previously mentioned. These channels in turn can easily be flushed clean internally, since they have inlets as well as outlets.

In order to ensure an effective clean-flushing of the top and bottom walls of the casing chamber, these walls are preferably made concave so as to form the aforementioned highest and lowest regions, respectively, of this chamber.

The invention is described more in detail below, reference being made to the accompanying drawing in which the single illustration is a vertical sectional view of an embodiment of the present filtering device, chosen by way of example and described in the following as used for separation of proteins from whey.

The device as illustrated comprises a vertical cylinder 1 having end walls 2 and 3 inserted liquid-tight in its ends. A tube 4, open at its two ends, extends vertically through the center of the cylinder and its end walls. The end walls 2 and 3 have conical inner surfaces 2a and 3a, respectively, which diverge from each other in the radially inward direction toward the central tube 4. Thus, the cavity or chamber 5 of the casing 1-3 has its highest and lowest regions at the central portions of the conical surfaces 2a and 3a, respectively. At these highest and lowest regions of chamber 5, the wall of the central tube 4 has holes 6 and 7.

Tubes 8 are inserted in the end walls and extend vertically into the chamber or cavity 5. Tubes 9 of cellulose acetate or other material, which can form semipermeable diaphragms, are telescoped onto opposing end portions of these inwardly projecting tubes 8. Covers 10 and 11 have annular cavities 12 and 13, which form an inlet and an outlet, respectively, for all of the tubes 9; and these covers are screwed to the end walls. The whey to be treated is supplied to the cavity 12 through an inlet tube 14, and the treated whey is discharged from the cavity 13 through an outlet tube 15. The bottom of the cavity 12 slopes outward and downward toward the tubes 8, and the bottom of the cavity 13 slopes downward toward the tube 15, thereby ensuring a good run-off from these cavities. The covers 10 and 11 are sealed to the end walls 2 and 3 by means of gaskets 16, 16a and 17, 17a.

In the operation of the device, whey from the tube 14 flows via cavity 12 downward into the tubes 9, which are kept completely filled by means of a suitable throttle (not shown) in the outlet 15. An aqueous solution of lactose, salts and other products of low-molecular weight trickles through the walls of the tubes 9 and flows downward along their outsides to the hole 7 and out through the lower end of tube 4. The proteins, which are of high molecular weight, cannot penetrate the walls of the tubes 9, so that a liquid protein concentrate discharges via cavity 13 through the tube 15.

The whey products which have passed through the device are an excellent nutriment for micro-organisms. Consequently, it is important that the device can be cleaned and sterilized effectively after use. For this reason, it is important that the surfaces where deposits from the whey can take place (i.e., the insides of the tubes 9) can be easily flushed clean. For this purpose, the tubes 9 are arranged vertically and the flushing of their interiors is carried out by supplying flushing liquid from above (i.e., through the tube 14) so that the deposits as well as droplet residues of flushing and disinfection liquid are always forced to move in the same direction, that is, downward with the assistance of gravity. No deposits take place on the outside of the tubes 9 and the other surfaces of the cavity 5; but for sterilization reasons, these surfaces must also be flushed clean. Thus, flushing liquid is also supplied through the lower end of the tube 4 and fills the entire cavity 5, all air in this cavity being displaced and discharging through the hole 6 while being followed by flushing liquid. This discharge through hole 6 can rise in tube 4 toward its open upper end. After flushing of the cavity 5 is completed, droplet residues of flushing and disinfection liquid will find their way downward to the hole 7 and discharge from the device through the lower end of tube 4. In this way, the desired sterile conditions are ensured.

I claim:

1. In a filtering device for a liquid, the combination of a casing forming a closed chamber having an inlet for liquid to be filtered and an outlet for filtered liquid, means forming at least one substantially vertical channel extending completely through said chamber and communicating with said inlet, said channel having a wall of filter material and also having an outlet disposed outside the casing and separate from said filtered liquid outlet, said chamber having a bottom wall sloping downward toward said filtered liquid outlet, said chamber also having a separate outlet for a flushing liquid and a top wall sloping upward toward said outlet for flushing liquid, and a vertical tube extending through said casing, the wall of said tube being pierced at the lowest region of said bottom wall to form said outlet for filtered liquid, the wall of said tube also being pierced at the highest region of said top wall to form said outlet for flushing liquid.

2. The combination according to claim 1 in which at least one of said chamber walls is concave so as to form at least one of said lowest and highest regions.

* * * * *